April 28, 1942.   W. L. POLLARD   2,281,077
VARIABLE SPEED TRANSMISSION
Filed Sept. 20, 1939

Inventor
Willard L. Pollard
By Ambro, Phiss, Olson & Mecklenburger
Attys.

Patented Apr. 28, 1942

2,281,077

UNITED STATES PATENT OFFICE 2,281,077

VARIABLE SPEED TRANSMISSION

Willard L. Pollard, Evanston, Ill.

Application September 20, 1939, Serial No. 295,792

10 Claims. (Cl. 74—189.5)

My invention relates to variable speed transmissions.

One of the objects of my invention is to provide an improved turbo-planetary transmission having a two-speed transmission between the motor and hydraulic torque converter.

A further object is to provide an improved turbo-planetary transmission having a two-speed gear transmission between the motor and hydraulic torque converter in which part of the power supplied to the drive shaft is not supplied through the hydraulic part of the transmission.

Further objects and advantages of the invention will be apparent from the description and claims.

In the drawing, in which two embodiments of my invention are shown,

Figure 1:
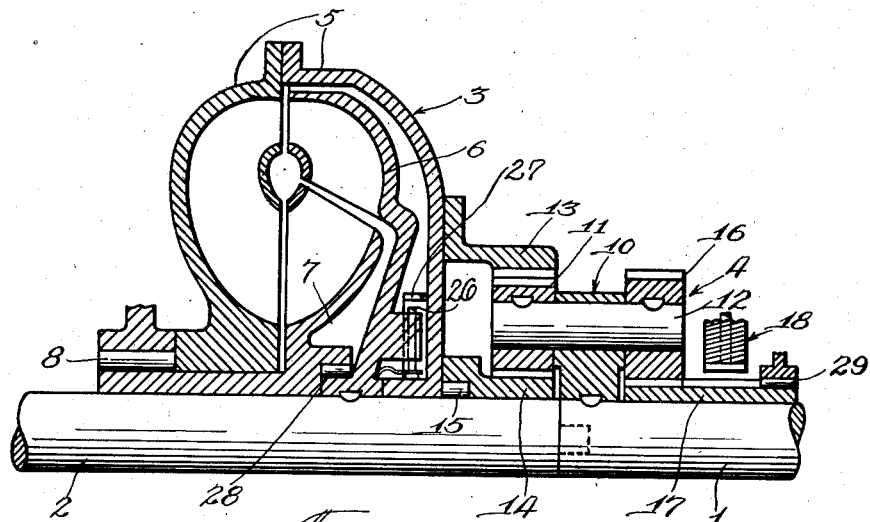
Figure 1 is an axial section showing one form of transmission.

Referring first to Fig. 1, the construction shown comprises a drive shaft 1 which may be connected to the motor, a driven shaft 2 which may be connected to the propeller shaft, a hydraulic torque converter 3, and a planetary gear construction 4. The hydraulic torque converter comprises a pump rotor 5, a turbine rotor 6 secured to the driven shaft 2, and a torque-converting stator 7 acting between the pump rotor 5 and the turbine rotor 6 and held against movement in one direction by means of a one-way roller clutch 8. If desired, centrifugal clutch means 26, 27 may be provided between the turbine rotor 6 and the pump rotor 5 for connecting the turbine rotor directly with the pump rotor when sufficient speed is attained.

The planetary gear construction comprises a gear carrier 10 secured to rotate with the drive shaft, a planet gear 11 keyed to a shaft 12 which is rotatable in the gear carrier 10, a ring gear 13 meshing with this planet gear 11 and secured to the pump rotor 5, a sun gear 14 meshing with this planet gear 11 and having a one-way roller clutch connection 15 with the driven shaft 2, a second planet gear 16 also keyed to the shaft 12, and a second sun gear 17 meshing with this second planet gear 16 through which the drive shaft 1 extends. This second sun gear 17 is not keyed to the drive shaft 1 but may, when desired, be held against rotation in any suitable manner as by means of a solenoid latch 18, as shown, or by means of a friction brake or the like.

In operation, the solenoid latch 18 may be released, if desired, in which condition the sun gear 17 exerts no control on the transmission. When the drive shaft 1 is rotated, the gear carrier 10 rotates with it, carrying with it the planet gears 11 and 16. The planet gear 11 exerts pressure on the sun gear 14 and on the ring gear 13. The sun gear exerts torque on the driven shaft 2 and the ring gear exerts torque on the pump rotor 5. The pump rotor 5, as it rotates, causes an increased torque to be exerted on the turbine rotor 6 which is keyed to the driven shaft 2. Thus, torque is exerted on the driven shaft both by the sun gear 14 and by the turbine rotor 6. When the torque on the driven shaft 2 becomes as low as the torque on the drive shaft 1, the torque-increasing stator 7 ceases to act as a torque-increasing member and tends to rotate along with the pump rotor 5 and the turbine rotor 6. Under these conditions, the hydraulic part of the transmission ceases to act as a hydraulic torque converter and acts as a hydraulic coupling.

If now, it is desired to effect an overdrive, the motor may be slowed up momentarily and the sun gear 17 latched against rotation by means of the solenoid latch 18. Under these conditions an overdrive will be effected through the ring gear 13 and hydraulic transmission, the driven shaft 2 travelling ahead of the sun gear 14 which it can do because of the free-wheeling, one-way clutch construction 15.

Figure 2:
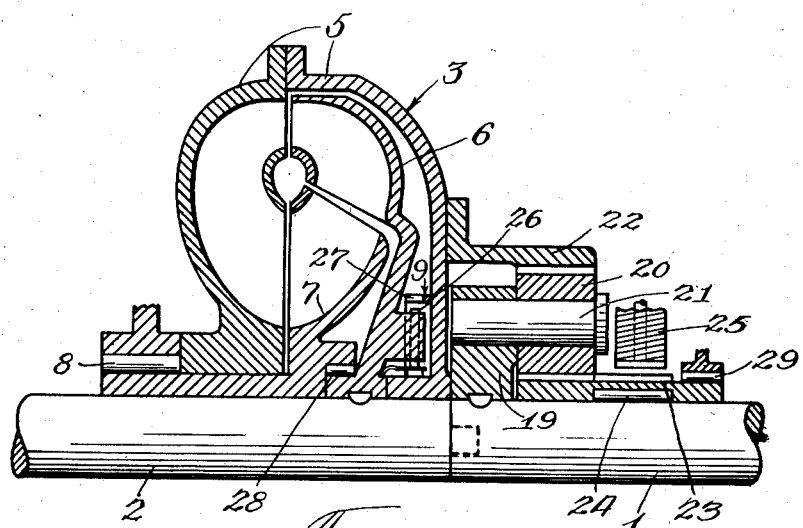
Fig. 2 is an axial section showing another embodiment of the invention.

The construction shown in Fig. 2 comprises a hydraulic torque converter 3 which is similar in every respect to the hydraulic torque converter of Fig. 1. In this form, the planetary gear construction comprises a gear carrier 19 keyed to rotate with the drive shaft 1, a planet gear 20 rotatable on a stub shaft 21 secured to the gear carrier 19, a ring gear 22 meshing with the planet gear 20 and secured to the pump rotor 5, and a sun gear 23 meshing with the planet gear 20 and having a one-way clutch, free-wheeling connection 24 with the drive shaft. A solenoid latch 25 may be provided for holding the sun gear 23 against rotation when desired.

In this form for the lower drive the solenoid latch 25 is released. As the drive shaft 1 rotates, it carries with it the gear carrier 19. The planet gear 20 exerts pressure, both on the sun gear 23 and ring gear 22. The sun gear 23, however, cannot turn ahead of the drive shaft 1 because of the free-wheeling, one-way clutch construction 24. This causes the ring gear 22 to rotate with the drive shaft 1, causing the pump rotor 5 to rotate with the drive shaft and causing an increased torque to be exerted on the turbine rotor 6 keyed to the driven shaft 2. When the torque on the driven shaft 2 becomes as low as the torque on the drive shaft 1, the hydraulic part of the transmission ceases to act as a torque converter and acts as a fluid coupling, just as in the form shown in Fig. 1. Also, just as in the form shown in Fig. 1, when the speed becomes sufficient, the turbine rotor can be connected directly with the pump rotor by means of a centrifugal clutch, this clutch connection being effected by slowing up the pump rotor until it is rotating in synchronism with the turbine rotor, whereupon the centrifugal dog clutch member 26 will fly out into engagement with the clutch member 27 carried by the pump rotor 5.

For overdrive, the drive shaft 1 is slowed up momentarily to bring the sun gear 23 to a position of rest, whereupon the solenoid latch 25 is moved to latching position to hold the sun gear against rotation. Thereafter an overdrive will be effected through the ring gear 22 and hydraulic transmission 3.

A one-way clutch construction 28 may be provided between the stator 7 and the turbine rotor 8 so that when the hydraulic transmission is acting as a coupling the stator 7 cannot overrun the turbine rotor 6 but will rotate as a unit wheel.

If desired, in order to prevent reverse rotation of the sun gears 17 and 23, a one-way clutch construction 29 may be provided. By thus preventing reverse rotation of the sun gears, excessive free wheeling of the ring gears 13 and 22 may be prevented.

Further modifications will be apparent to those skilled in the art and it is desired, therefore, that the invention be limited only by the prior art and the scope of the appended claims.

Having thus described my invention, what I claim and desire to secure by Letters Patent is:

1. A variable speed transmission comprising a rotatable power transmitting drive member, a rotatable power transmitting driven member coaxial therewith, a hydraulic torque converter, and a planetary gear construction, said planetary gear construction comprising a gear carrier secured to said drive member, planet gearing carried by said gear carrier, a sun gear meshing with said planet gearing, and a ring gear meshing with said planet gearing, releasable means for holding said sun gear against rotation, one-way clutch means for causing said sun gear to rotate with said drive member, said hydraulic torque converter comprising a pump rotor connected to rotate with said ring gear, a turbine rotor connected to rotate with the driven member, and a torque varying stator acting between said pump rotor and turbine rotor.

2. A variable speed transmission comprising a rotatable power transmitting drive member, a rotatable power transmitting driven member coaxial therewith, a hydraulic torque converter, and a planetary gear construction, said planetary gear construction comprising a gear carrier secured to said drive member, planet gearing carried by said gear carrier, a sun gear meshing with said planet gearing, and a ring gear meshing with said planet gearing, releasable means for holding said sun gear against rotation, one-way clutch means for causing said sun gear to rotate with said drive member, said hydraulic torque converter comprising a pump rotor connected to rotate with said ring gear, a turbine rotor connected to rotate with the driven member, a torque varying stator acting between said pump rotor and turbine rotor, and one-way anchorage means for holding said stator against rotation in one direction.

3. A variable speed transmission comprising a rotatable power transmitting drive member, a rotatable power transmitting driven member coaxial therewith, a hydraulic torque converter, and a planetary gear construction, said planetary gear construction comprising a gear carrier secured to said drive member, a first sun gear through which said drive member extends, a first planet gear mounted on said gear carrier and meshing with said sun gear, a second planet gear mounted on said gear carrier and rotatable with said first planet gear, a ring gear meshing with one of said planet gears and a second sun gear meshing with said second planet gear, releasable means for holding said first sun gear against rotation, said hydraulic torque converter comprising a pump rotor connected to rotate with said ring gear, a turbine rotor connected to rotate with said driven member and a torque-varying stator acting between said pump rotor and turbine rotor, and one-way clutch means between said second sun gear and said driven member.

4. A variable speed transmission comprising a rotatable power transmitting drive member, a rotatable power transmitting driven member coaxial therewith, a hydraulic torque converter, and a planetary gear construction, said planetary gear construction comprising a gear carrier secured to said drive member, planet gearing carried by said gear carrier, a sun gear meshing with said planet gearing, and a ring gear meshing with said planet gearing, releasable means for holding said sun gear against rotation, overrunning clutch means for causing said sun gear to rotate with said drive member, said hydraulic torque converter comprising a pump rotor connected to rotate with said ring gear, a turbine rotor connected to rotate with the driven member, and a torque varying stator acting between said pump rotor and turbine rotor.

5. A variable speed transmission comprising a fluid torque converter which includes a pump rotor, a turbine rotor, and a stato-rotor, a planetary transmission which comprises a sun gear, a ring gear, a gear carrier and planet gearing carried by said carrier and meshing with said sun gear and ring gear, a rotatable power transmitting drive member, a rotatable power transmitting driven member, one way anchorage means for holding said stato-rotor against rotation, said gear carrier being connected to rotate with one of said members, overrunning clutch means for preventing said sun gear from over-running said one member, releasable means for holding said sun gear against rotation, said torque converter and planetary transmission being connected in series power flow relation between said drive member and driven member, whereby for one speed ratio condition the sun gear may be held against rotation to effect over-drive of the ring gear with respect to the gear carrier, while the reaction on the stato-rotor is sufficient to hold it against forward rotation, whereby for another speed ratio condition the sun gear may be released for rotation and held by the clutch means from over-running said one member so that the planetary transmission rotates as a unit, and whereby for another speed ratio condition the sun gear may be held against rotation to effect over-drive of the turbine motor with respect to the gear carrier while the reaction on the stator is insufficient to hold it against forward rotation.

6. A variable speed transmission comprising a rotatable power transmitting drive member, a rotatable power transmitting driven member coaxial therewith, a hydraulic torque converter, and a planetary gear construction, said planetary gear construction comprising a gear carrier secured to said drive member, planet gearing carried by said gear carrier, a sun gear meshing with said planet gearing, and a ring gear meshing with said planet gearing, releasable means for holding said sun gear against rotation, overrunning clutch means for causing said sun gear to rotate with said drive member, said hydraulic torque converter comprising a pump rotor connected to rotate with said ring gear, a turbine rotor connected to rotate with the driven member, and a torque varying stator acting between said pump rotor and turbine rotor, said drive member extending through said sun gear.

7. A variable speed transmission comprising a drive shaft, a driven shaft coaxial therewith, a hydraulic torque converter, and a planetary gear construction, said planetary gear construction comprising a gear carrier secured to said drive shaft, planet gearing carried by said gear carrier, a ring gear meshing with said planet gearing and two sun gears both in force-transmitting relation to said ring gear through said planet gearing, releasable means for holding one of said sun gears against rotation, and one-way clutch means for preventing the other sun gear from overrunning one of said shafts, said hydraulic torque converter comprising a pump rotor connected to rotate with said ring gear, and a turbine rotor driven from said pump rotor connected in force-transmitting relation to said driven shaft independently of said one-way clutch.

8. A variable speed transmission comprising a drive shaft, a driven shaft coaxial therewith, a hydraulic torque converter, and a planetary gear construction, said planetary gear construction comprising a gear carrier secured to said drive shaft, planet gearing carried by said gear carrier, a ring gear meshing with said planet gearing and two sun gears both in force-transmitting relation to said ring gear through said planet gearing, releasable means for holding one of said sun gears against rotation, and one-way clutch means for preventing the other sun gear from overrunning one of said shafts, said hydraulic torque converter comprising a pump rotor connected to rotate with said ring gear, a turbine rotor driven from said pump rotor connected in force-transmitting relation to said driven shaft independently of said one-way clutch, a torque varying stator acting between said pump rotor and turbine rotor, and one-way anchorage means for holding said stator against rotation in one direction.

9. A variable speed transmission comprising a drive shaft, a driven shaft coaxial therewith, a hydraulic torque converter, and a planetary gear construction, said planetary gear construction comprising a gear carrier secured to said drive shaft, planet gearing carried by said gear carrier, a ring gear meshing with said planet gearing and two sun gears both in force-transmitting relation to said ring gear through said planet gearing, releasable means for holding one of said sun gears against rotation, and one-way clutch means for preventing the other sun gear from overrunning one of said shafts, said hydraulic torque converter comprising a pump rotor connected to rotate with said ring gear, a turbine rotor driven from said pump rotor connected in force-transmitting relation to said driven shaft independently of said one-way clutch, and a torque varying stator acting between said pump rotor and turbine rotor.

10. A variable speed transmission comprising a rotatable power transmitting drive member, a rotatable power transmitting driven member coaxial therewith, a hydraulic torque-transmitting device, and a planetary gear construction, said planetary gear construction comprising a gear carrier secured to said drive member, planet gearing carried by said gear carrier, a sun gear meshing with said planet gearing, and a ring gear meshing with said planet gearing, releasable means for holding said sun gear against rotation, overrunning clutch means for causing said sun gear to rotate with said drive member, said hydraulic torque-transmitting device comprising a pump rotor connected to rotate with said ring gear, and a turbine rotor connected to rotate with the driven member.

WILLARD L. POLLARD.